(12) United States Patent
Kinoshita

(10) Patent No.: US 10,627,353 B2
(45) Date of Patent: Apr. 21, 2020

(54) X-RAY INSPECTION APPARATUS AND METHOD FOR CONTROLLING X-RAY INSPECTION APPARATUS

(71) Applicant: JED CO., LTD, Azumino-shi, Nagano (JP)

(72) Inventor: Osamu Kinoshita, Azumino (JP)

(73) Assignee: JED CO., LTD (JP)

( * ) Notice: Subject to any disclaimer, the term of this patent is extended or adjusted under 35 U.S.C. 154(b) by 0 days.

(21) Appl. No.: 16/099,908

(22) PCT Filed: Apr. 14, 2017

(86) PCT No.: PCT/JP2017/015291
§ 371 (c)(1),
(2) Date: Nov. 8, 2018

(87) PCT Pub. No.: WO2017/203886
PCT Pub. Date: Nov. 30, 2017

(65) Prior Publication Data
US 2019/0178819 A1    Jun. 13, 2019

(30) Foreign Application Priority Data

May 24, 2016   (JP) .................................. 2016-102988
May 31, 2016   (JP) .................................. 2016-108236

(51) Int. Cl.
*G01N 23/046*   (2018.01)
*G01N 23/04*    (2018.01)

(52) U.S. Cl.
CPC .......... *G01N 23/046* (2013.01); *G01N 23/04* (2013.01); *G01N 2223/401* (2013.01)

(58) Field of Classification Search
CPC . G01N 2223/401; G01N 23/04; G01N 23/046
See application file for complete search history.

(56) References Cited

U.S. PATENT DOCUMENTS 5,023,895 A * 6/1991 McCroskey ......... G01N 23/046
378/10
5,164,971 A * 11/1992 Peyret ................... G06T 11/005
378/19

(Continued)

FOREIGN PATENT DOCUMENTS

JP   2004-354215 A   12/2004
JP   2005-292047 A   10/2005

*Primary Examiner* — Chih-Cheng Kao
(74) *Attorney, Agent, or Firm* — Harness, Dickey & Pierce, P.L.C.

(57) ABSTRACT

In an X-ray inspection apparatus, X-ray images of an inspection object horizontally divided at a predetermined vertical position are acquired for each fixed rotational angle of the inspection object over 360° by a two-dimensional X-ray detector. Processing for synthesizing X-ray images acquired at the same rotational angle of the inspection object among the X-ray images taken in from the X-ray detector by horizontally joining the X-ray images together is executed for each fixed rotational angle of the inspection object. Processing for vertically dividing the synthesized X-ray image into a plurality of strip X-ray images is executed. Thereafter, processing for generating a CT image is executed by performing a computation based on the strip X-ray images for 360° that are at the same vertical position.

9 Claims, 6 Drawing Sheets

(56) References Cited

U.S. PATENT DOCUMENTS

| | | | |
|---|---|---|---|
| 7,016,465 B2 * | 3/2006 | Kamegawa | G01N 23/046 378/19 |
| 7,187,752 B2 * | 3/2007 | Kotler | G21K 5/04 250/453.11 |
| 7,356,115 B2 * | 4/2008 | Ford | G01N 23/046 378/4 |

* cited by examiner

| C11 | B11 | A11 | —X1-1 |
|---|---|---|---|
| C12 | B12 | A12 | —X1-2 |
| C13 | B13 | A13 | —X1-3 |
| C14 | B14 | A14 | —X1-4 |
| C21 | B21 | A21 | —X2-1 |
| C22 | B22 | A22 | —X2-2 |
| C23 | B23 | A23 | —X2-3 |
| C24 | B24 | A24 | —X2-4 |

⋮

| C10001 | B10001 | A10001 | —X1000-1 |
|---|---|---|---|
| C10002 | B10002 | A10002 | —X1000-2 |
| C10003 | B10003 | A10003 | —X1000-3 |
| C10004 | B10004 | A10004 | —X1000-4 |

Fig. 4B

X-RAY INSPECTION APPARATUS AND METHOD FOR CONTROLLING X-RAY INSPECTION APPARATUS

CROSS-REFERENCE TO RELATED APPLICATIONS

This application is a U.S. National Stage Application of International Application No. PCT/JP2017/015291, filed on Apr. 14, 2017, and published in Japanese as WO 2017/203886 A1 on Nov. 30, 2017 and claims priority to Japanese Application No. 2016-108236, filed on May 31, 2016 and Japanese Application No. 2016-102988, filed on May 24, 2016. The entire disclosures of the above applications are incorporated herein by reference.

TECHNICAL FIELD

The present invention relates to an X-ray inspection apparatus for nondestructively inspecting the inside of an industrial product or the like and a method for controlling such an X-ray inspection apparatus.

RELATED ART

Conventionally, an X-ray inspection apparatus for nondestructively inspecting the inside of an inspection object such as an industrial product has been known (for example, see Japanese Patent Application Laid-open No. 2004-354215 and Japanese Patent Application Laid-open No. 2005-292047). The X-ray inspection apparatus described in JP 2004-354215 includes an X-ray source that irradiates an inspection object with X-rays, an X-ray line sensor (line sensor), a rotary table on which the inspection object is placed and that rotates with a vertical direction as an axial direction of the rotation, and a moving mechanism that vertically moves the line sensor. In this X-ray inspection apparatus, a plurality of X-ray images are acquired by the line sensor by rotating the inspection object that is placed between the X-ray source and the line sensor at a fixed speed while moving the line sensor from the upper end of the inspection object to the lower end thereof in synchronization with the rotation of the inspection object, and a CT image of the inspection object is generated from the plurality of acquired X-ray images.

Furthermore, in JP 2005-292047, disclosed as a conventional technology is an X-ray inspection apparatus that, when an inspection object is large and required spatial resolution is high, acquires partial projections of a quadrant (or one eighth division) of the inspection object by rotating a rotation mechanism of the inspection object by for example 4 or more rounds (360°×4 or more rotations) and moving a two-dimensional detector for each 360° and obtains an entire projection by synthesizing the acquired partial projections.

In the X-ray inspection apparatus described in JP 2004-354215, it is difficult to acquire an appropriate CT image unless the amount of descent of the line sensor with respect to one rotation of the inspection object is reduced. For example, unless the amount of descent of the line sensor during one rotation of the inspection object is set to an extent of 0.1 to 0.2 mm, it is difficult to generate an appropriate CT image by this X-ray inspection apparatus. Accordingly, in this X-ray inspection apparatus, when the inspection object is large, the number of times to rotate the inspection object at the time of inspecting the inspection object is increased, and as a result, it takes time to acquire X-ray images necessary for generating CT images of the entire inspection object and the inspection time for the inspection object is prolonged.

Meanwhile, in the X-ray inspection apparatus disclosed in JP 2005-292047, because the X-ray images necessary for generating the CT images of the entire inspection object can be acquired when the inspection object is rotated four times or rotated eight times even if the inspection object is large, it is possible to shorten the acquisition time for the X-ray images necessary for generating the CT images of the entire inspection object. However, even if the X-ray images necessary for generating the CT images of the entire inspection object can be acquired in a short time, when it takes time for CT image generation processing for generating the CT images by performing a predetermined computation based on the acquired X-ray images, it is not possible to shorten the inspection time for the inspection object.

Thus, an object of the present invention is to provide an X-ray inspection apparatus and a method for controlling the X-ray inspection apparatus that, even when an inspection object is large, are capable of shortening the inspection time for an inspection object by shortening the acquisition time for X-ray images necessary for generating CT images of the entire inspection object, and by shortening the time for the CT image generation processing for generating the CT images based on the acquired X-ray images.

SUMMARY

In order to solve the above-described problem, an X-ray inspection apparatus of the present invention includes an X-ray generator; a two-dimensional X-ray detector arranged so as to sandwich an inspection object between the X-ray generator and the two-dimensional X-ray detector; a rotation mechanism configured to rotate the X-ray generator and the two-dimensional X-ray detector or rotate the inspection object so that the X-ray generator and the two-dimensional X-ray detector relatively rotate with respect to the inspection object on the outer circumferential side of the inspection object; and a processing unit configured to take in and process X-ray images acquired by the two-dimensional X-ray detector; and includes, assuming that a predetermined direction parallel to a detection surface of the two-dimensional X-ray detector is a first direction, a direction parallel to the detection surface and orthogonal to the first direction is a second direction, and a direction of relative rotation of the X-ray generator and the two-dimensional X-ray detector with respect to the inspection object is a relative rotation direction, a moving mechanism configured to translate the two-dimensional X-ray detector or translate the inspection object so that the two-dimensional X-ray detector relatively moves in at least the first direction with respect to the inspection object; and a controller connected to the X-ray generator, the two-dimensional X-ray detector, the rotation mechanism, and the moving mechanism, in which, assuming that a plane including the detection surface is a virtual projection plane, and a projection image of the entire inspection object projected on the virtual projection plane by X-rays emitted by the X-ray generator is a virtual projection image, the detection surface is smaller than the virtual projection image in at least the first direction; the controller causes the two-dimensional X-ray detector to acquire X-ray images of the inspection object divided in the first direction at a predetermined position in the second direction for each fixed angle in the relative rotation direction extending over 360°, by alternately performing an image acquisition operation that causes the X-ray generator and the two-dimensional X-ray detector to relatively rotate by 360° with respect to the inspection object by the rotation mechanism and causes the two-dimensional X-ray detector to acquire an X-ray image for each fixed angle and performing a moving operation that relatively moves the two-dimensional X-ray detector to one side of the first direction with respect to the inspection object by the moving mechanism; and assuming that X-ray images of the inspection object acquired for each fixed angle in the relative rotation direction extending over 360° and divided in the first direction at a predetermined position in the second direction are one-row X-ray images, the processing unit executes synthesis processing for synthesizing a plurality of X-ray images acquired at the same angle in the relative rotation direction among the one-row X-ray images taken in from the two-dimensional X-ray detector by joining the X-ray images together in the first direction for each fixed angle of the relative rotation direction, and after the synthesis processing, executes division processing for dividing the synthesized X-ray image in the second direction into a plurality of strip X-ray images, and after the division processing, executes CT image generation processing for generating a CT image by performing a predetermined computation based on strip X-ray images for 360° that are at the same position in the second direction, or the processing unit executes division processing for dividing the one-row X-ray images taken in from the two-dimensional X-ray detector into a plurality of pieces in the second direction, and after the division processing, executes synthesis processing for synthesizing, for each fixed angle in the relative rotation direction, a strip X-ray image by joining together in the first direction a plurality of X-ray images obtained after the division that are at the same position in the second direction and acquired at the same angle in the relative rotation direction, and after the synthesis processing, executes CT image generation processing for generating a CT image by performing a predetermined computation based on strip X-ray images for 360° that are at the same position in the second direction.

In addition, in order to solve the above-described problem, a method for controlling an X-ray inspection apparatus of the present invention is a method for controlling an X-ray inspection apparatus that includes an X-ray generator; a two-dimensional X-ray detector arranged so as to sandwich an inspection object between the X-ray generator and the two-dimensional X-ray detector; and a rotation mechanism configured to rotate the X-ray generator and the two-dimensional X-ray detector or rotate the inspection object so that the X-ray generator and the two-dimensional X-ray detector relatively rotate with respect to the inspection object on the outer circumferential side of the inspection object; and includes, assuming that a predetermined direction parallel to a detection surface of the two-dimensional X-ray detector is a first direction, a direction parallel to the detection surface and orthogonal to the first direction is a second direction, and a direction of relative rotation of the X-ray generator and the two-dimensional X-ray detector with respect to the inspection object is a relative rotation direction, a moving mechanism configured to translate the two-dimensional X-ray detector or translate the inspection object so that the two-dimensional X-ray detector relatively moves in at least the first direction with respect to the inspection object, in which, assuming that a plane including the detection surface is a virtual projection plane, and a projection image of the entire inspection object projected on the virtual projection plane by X-rays emitted by the X-ray generator is a virtual projection image, the detection surface is smaller than the virtual projection image in at least the first direction; and the method for controlling the X-ray inspection apparatus includes causing the two-dimensional X-ray detector to acquire X-ray images of the inspection object divided in the first direction at a predetermined position in the second direction for each fixed angle in the relative rotation direction extending over 360°, by alternately performing an image acquisition operation that causes the X-ray generator and the two-dimensional X-ray detector to relatively rotate by 360° with respect to the inspection object by the rotation mechanism and causes the two-dimensional X-ray detector to acquire an X-ray image for each fixed angle and performing a moving operation that relatively moves the two-dimensional X-ray detector to one side of the first direction with respect to the inspection object by the moving mechanism; and assuming that X-ray images of the inspection object acquired for each fixed angle in the relative rotation direction extending over 360° and divided in the first direction at a predetermined position in the second direction are one-row X-ray images, executing synthesis processing for synthesizing a plurality of X-ray images acquired at the same angle in the relative rotation direction among the one-row X-ray images taken in from the two-dimensional X-ray detector by joining the X-ray images together in the first direction for each fixed angle of the relative rotation direction, and after the synthesis processing, executing division processing for dividing the synthesized X-ray image in the second direction into a plurality of strip X-ray images, and after the division processing, executing CT image generation processing for generating a CT image by performing a predetermined computation based on strip X-ray images for 360° that are at the same position in the second direction, or executing division processing for dividing the one-row X-ray images taken in from the two-dimensional X-ray detector into a plurality of pieces in the second direction, and after the division processing, executing synthesis processing for synthesizing, for each fixed angle in the relative rotation direction, a strip X-ray image by joining together in the first direction a plurality of X-ray images obtained after division that are at the same position in the second direction and acquired at the same angle in the relative rotation direction, and after the synthesis processing, executing CT image generation processing for generating a CT image by performing a predetermined computation based on strip X-ray images for 360° that are at the same position in the second direction.

In the present invention, by alternately performing the image acquisition operation that causes the X-ray generator and the two-dimensional X-ray detector to relatively rotate by 360° with respect to the inspection object by the rotation mechanism and causes the two-dimensional X-ray detector to acquire an X-ray image for each fixed angle and performing the moving operation that relatively moves the two-dimensional X-ray detector to one side of the first direction with respect to the inspection object by the moving mechanism, the two-dimensional X-ray detector is caused to acquire X-ray images of the inspection object divided in the first direction at a predetermined position in the second direction for each fixed angle in the relative rotation direction extending over 360°. Thus, in the present invention, even when the inspection object is large, in acquiring the X-ray images necessary for generating the CT images of the entire inspection object, it is possible to reduce the number of times of relatively rotating the X-ray generator and the two-dimensional X-ray detector with respect to the inspection object. Accordingly, in the present invention, even when the inspection object is large, it is possible to shorten the acquisition time for the X-ray images necessary for generating the CT images of the entire inspection object.

Furthermore, in the present invention, the synthesis processing for synthesizing a plurality of X-ray images acquired at the same angle in the relative rotation direction among the one-row X-ray images taken in from the two-dimensional X-ray detector by joining the X-ray images together in the first direction is executed for each fixed angle of the relative rotation direction, and after the synthesis processing, the division processing for dividing the synthesized X-ray image in the second direction into a plurality of strip X-ray images is executed, and after the division processing, the CT image generation processing for generating a CT image by performing a predetermined computation based on strip X-ray images for 360° that are at the same position in the second direction is executed, or the division processing for dividing the one-row X-ray images taken in from the two-dimensional X-ray detector into a plurality of pieces in the second direction is executed, and after the division processing, the synthesis processing for synthesizing a strip X-ray image by joining together in the first direction a plurality of X-ray images obtained after division that are at the same position in the second direction and acquired at the same angle in the relative rotation direction is executed for each fixed angle in the relative rotation direction, and after the synthesis processing, the CT image generation processing for generating a CT image by performing a predetermined computation based on strip X-ray images for 360° that are at the same position in the second direction is executed. Thus, in the present invention, by setting the width (width in the second direction) of strip X-ray images according to the processing power of the processing unit, it is possible to shorten the time for the CT image generation processing for generating a CT image by performing a predetermined computation based on the strip X-ray images for 360° that are at the same position in the second direction.

As in the foregoing, in the present invention, even when the inspection object is large, it is possible to shorten the acquisition time for the X-ray images necessary for generating the CT images of the entire inspection object, and it is possible to shorten the time for the CT image generation processing for generating the CT images based on the acquired X-ray images. Accordingly, in the present invention, even when the inspection object is large, it is possible to shorten the inspection time for the inspection object.

In the present invention, for example, the detection surface of the two-dimensional X-ray detector is smaller than the virtual projection image in the first direction and the second direction, and when the one-row X-ray images are acquired by the two-dimensional X-ray detector, the controller relatively moves the two-dimensional X-ray detector in at least the second direction with respect to the inspection object by the moving mechanism, and thereafter, by alternately performing the image acquisition operation and the moving operation, causes the two-dimensional X-ray detector to acquire the one-row X-ray images, that come next in the second direction, of the inspection object.

In this case, the X-ray inspection apparatus preferably includes, as the processing unit, a first processing unit connected to the two-dimensional X-ray detector and configured to take in X-ray images acquired by the two-dimensional X-ray detector and a second processing unit connected to the first processing unit, and preferably, when taking in the one-row X-ray images, the first processing unit transmits the taken-in one-row X-ray images to the second processing unit as is and the second processing unit executes the synthesis processing, the division processing, and the CT image generation processing. Furthermore, in this case, the X-ray inspection apparatus may include, as the processing unit, a first processing unit connected to the two-dimensional X-ray detector and configured to take in X-ray images acquired by the two-dimensional X-ray detector and a second processing unit connected to the first processing unit, and the first processing unit may execute the synthesis processing and the division processing when taking in the one-row X-ray images, and the second processing unit may execute the CT image generation processing based on strip X-ray images for 360° that are taken in from the first processing unit and are at the same position in the second direction.

With this configuration, while executing the processing for taking in the X-ray images of a high processing load by the first processing unit, it is possible to execute the CT image generation processing of a high processing load by the second processing unit in parallel. Accordingly, it is possible to shorten the time for the CT image generation processing as compared with the case in which the processing for taking in the X-ray images and the CT image generation processing are executed by a single processing unit having the processing power of the same extent as the processing power of the first processing unit and the second processing unit, and as a result, it is possible to further shorten the inspection time for the inspection object.

Moreover, in order to solve the above-described problem, an X-ray inspection apparatus of the present invention includes an X-ray generator; a two-dimensional X-ray detector arranged so as to sandwich an inspection object between the X-ray generator and the two-dimensional X-ray detector; a rotation mechanism configured to rotate the X-ray generator and the two-dimensional X-ray detector or rotate the inspection object so that the X-ray generator and the two-dimensional X-ray detector relatively rotate with respect to the inspection object on the outer circumferential side of the inspection object; and a processing unit configured to take in and process X-ray images acquired by the two-dimensional X-ray detector; and includes, assuming that a predetermined direction parallel to a detection surface of the two-dimensional X-ray detector is a first direction, a direction parallel to the detection surface and orthogonal to the first direction is a second direction, and a direction of relative rotation of the X-ray generator and the two-dimensional X-ray detector with respect to the inspection object is a relative rotation direction, a moving mechanism configured to translate the two-dimensional X-ray detector or translate the inspection object so that the two-dimensional X-ray detector relatively moves in the first direction and the second direction with respect to the inspection object; and a controller connected to the X-ray generator, the two-dimensional X-ray detector, the rotation mechanism, and the moving mechanism, in which, assuming that a plane including the detection surface is a virtual projection plane, and a projection image of the entire inspection object projected on the virtual projection plane by X-rays emitted by the X-ray generator is a virtual projection image, the detection surface is smaller than the virtual projection image in the first direction and the second direction; the controller causes the two-dimensional X-ray detector to acquire X-ray images of the inspection object divided in the first direction at a predetermined position in the second direction for each fixed angle in the relative rotation direction extending over 360°, by alternately performing an image acquisition operation that causes the X-ray generator and the two-dimensional X-ray detector to relatively rotate by 360° with respect to the inspection object by the rotation mechanism and causes the two-dimensional X-ray detector to acquire an X-ray image for each fixed angle and performing a moving operation that relatively moves the two-dimensional X-ray detector to one side of the first direction with respect to the inspection object by the moving mechanism; and assuming that X-ray images of the inspection object acquired for each fixed angle in the relative rotation direction extending over 360° and divided in the first direction at a predetermined position in the second direction are one-row X-ray images, the controller, when the one-row X-ray images are acquired by the two-dimensional X-ray detector, relatively moves the two-dimensional X-ray detector in at least the second direction with respect to the inspection object by the moving mechanism, and thereafter, by alternately performing the image acquisition operation and the moving operation, causes the two-dimensional X-ray detector to acquire the one-row X-ray images, that come next in the second direction, of the inspection object; and the processing unit executes synthesis processing for synthesizing a plurality of X-ray images acquired at the same angle in the relative rotation direction among the one-row X-ray images taken in from the two-dimensional X-ray detector by joining the X-ray images together in the first direction for each fixed angle of the relative rotation direction, and after the synthesis processing, executes CT image generation processing for generating a CT image by performing a predetermined computation based on synthesized X-ray images for 360°.

In addition, in order to solve the above-described problem, a method for controlling an X-ray inspection apparatus of the present invention is a method for controlling an X-ray inspection apparatus that includes an X-ray generator; a two-dimensional X-ray detector arranged so as to sandwich an inspection object between the X-ray generator and the two-dimensional X-ray detector; and a rotation mechanism configured to rotate the X-ray generator and the two-dimensional X-ray detector or rotate the inspection object so that the X-ray generator and the two-dimensional X-ray detector relatively rotate with respect to the inspection object on the outer circumferential side of the inspection object; and includes, assuming that a predetermined direction parallel to a detection surface of the two-dimensional X-ray detector is a first direction, a direction parallel to the detection surface and orthogonal to the first direction is a second direction, and a direction of relative rotation of the X-ray generator and the two-dimensional X-ray detector with respect to the inspection object is a relative rotation direction, a moving mechanism configured to translate the two-dimensional X-ray detector or translate the inspection object so that the two-dimensional X-ray detector relatively moves in the first direction and the second direction with respect to the inspection object, in which, assuming that a plane including the detection surface is a virtual projection plane, and a projection image of the entire inspection object projected on the virtual projection plane by X-rays emitted by the X-ray generator is a virtual projection image, the detection surface is smaller than the virtual projection image in the first direction and the second direction; and the method for controlling the X-ray inspection apparatus includes causing the two-dimensional X-ray detector to acquire X-ray images of the inspection object divided in the first direction at a predetermined position in the second direction for each fixed angle in the relative rotation direction extending over 360°, by alternately performing an image acquisition operation that causes the X-ray generator and the two-dimensional X-ray detector to relatively rotate by 360° with respect to the inspection object by the rotation mechanism and causing the two-dimensional X-ray detector to acquire an X-ray image for each fixed angle and performing a moving operation that relatively moves the two-dimensional X-ray detector to one side of the first direction with respect to the inspection object by the moving mechanism; and assuming that X-ray images of the inspection object acquired for each fixed angle in the relative rotation direction extending over 360° and divided in the first direction at a predetermined position in the second direction are one-row X-ray images, causing the two-dimensional X-ray detector to acquire the one-row X-ray images, that come next in the second direction, of the inspection object when the one-row X-ray images are acquired by the two-dimensional X-ray detector, by relatively moving the two-dimensional X-ray detector in at least the second direction with respect to the inspection object by the moving mechanism, and thereafter, by alternately performing the image acquisition operation and the moving operation; and executing synthesis processing for synthesizing a plurality of X-ray images acquired at the same angle in the relative rotation direction among the one-row X-ray images taken in from the two-dimensional X-ray detector by joining the X-ray images together in the first direction for each fixed angle of the relative rotation direction, and after the synthesis processing, executing CT image generation processing for generating a CT image by performing a predetermined computation based on synthesized X-ray images for 360°.

In the present invention, by alternately performing the image acquisition operation that causes the X-ray generator and the two-dimensional X-ray detector to relatively rotate by 360° with respect to the inspection object by the rotation mechanism and causes the two-dimensional X-ray detector to acquire an X-ray image for each fixed angle and performing the moving operation that relatively moves the two-dimensional X-ray detector to one side of the first direction with respect to the inspection object by the moving mechanism, the two-dimensional X-ray detector is caused to acquire X-ray images of the inspection object divided in the first direction at a predetermined position in the second direction for each fixed angle in the relative rotation direction extending over 360°. Furthermore, in the present invention, when the one-row X-ray images are acquired by the two-dimensional X-ray detector, the two-dimensional X-ray detector is caused, by relatively moving the two-dimensional X-ray detector in at least the second direction with respect to the inspection object by the moving mechanism, and thereafter by alternately performing the image acquisition operation and the moving operation, to acquire the one-row X-ray images, that come next in the second direction, of the inspection object. Thus, in the present invention, even when the inspection object is large in both directions of the first direction and the second direction, in acquiring the X-ray images necessary for generating the CT images of the entire inspection object, it is possible to reduce the number of times of relatively rotating the X-ray generator and the two-dimensional X-ray detector with respect to the inspection object. Accordingly, in the present invention, even when the inspection object is large in both directions of the first direction and the second direction, it is possible to shorten the acquisition time for the X-ray images necessary for generating the CT images of the entire inspection object.

Furthermore, in the present invention, the synthesis processing for synthesizing a plurality of X-ray images acquired at the same angle in the relative rotation direction among the one-row X-ray images taken in from the two-dimensional X-ray detector by joining the X-ray images together in the first direction is executed for each fixed angle of the relative rotation direction, and after the synthesis processing, the CT image generation processing for generating a CT image by performing a predetermined computation based on synthesized X-ray images for 360° is executed. That is, in the present invention, a CT image is generated for each one-row X-ray images that are X-ray images of the inspection object at a predetermined position in the second direction. Thus, it is possible to shorten the time for the CT image generation processing in the present invention even when the inspection object is large in both directions of the first direction and the second direction, as compared with the case in which an X-ray image of the entire inspection object is acquired by a large two-dimensional X-ray sensor for each fixed angle in the relative rotation direction extending over 360° and a CT image of the entire inspection object is generated at one time by performing a predetermined computation based on the acquired X-ray images.

As in the foregoing, in the present invention, even when the inspection object is large, it is possible to shorten the acquisition time for the X-ray images necessary for generating the CT images of the entire inspection object, and it is possible to shorten the time for the CT image generation processing for generating the CT images based on the acquired X-ray images. Accordingly, in the present invention, even when the inspection object is large, it is possible to shorten the inspection time for the inspection object.

In the present invention, the X-ray inspection apparatus preferably includes, as the processing unit, a first processing unit connected to the two-dimensional X-ray detector and configured to take in X-ray images acquired by the two-dimensional X-ray detector and a second processing unit connected to the first processing unit, and preferably, when taking in the one-row X-ray images, the first processing unit transmits the taken-in one-row X-ray images to the second processing unit as is and the second processing unit executes the synthesis processing and the CT image generation processing. Furthermore, in the present invention, the X-ray inspection apparatus may include, as the processing unit, a first processing unit connected to the two-dimensional X-ray detector and configured to take in X-ray images acquired by the two-dimensional X-ray detector and a second processing unit connected to the first processing unit, and the first processing unit may execute the synthesis processing when taking in the one-row X-ray images, and the second processing unit may execute the CT image generation processing based on the X-ray images that are obtained after the synthesis processing and taken in from the first processing unit.

With this configuration, while executing the processing for taking in the X-ray images of a high processing load by the first processing unit, it is possible to execute the CT image generation processing of a high processing load by the second processing unit in parallel. Accordingly, it is possible to shorten the time for the CT image generation processing as compared with the case in which the processing for taking in the X-ray images and the CT image generation processing are executed by a single processing unit having the processing power of the same extent as the processing power of the first processing unit and the second processing unit, and as a result, it is possible to further shorten the inspection time for the inspection object.

Advantageous Effects of Invention

As in the foregoing, in the present invention, even when the inspection object is large, it is possible to shorten the acquisition time for the X-ray images necessary for generating the CT images of the entire inspection object and it is also possible to shorten the time for the CT image generation processing for generating the CT images based on the acquired X-ray images. Thus, it is possible to shorten the inspection time for the inspection object.

BRIEF DESCRIPTION OF DRAWINGS

FIGS. 4A and 4B are diagrams explaining the synthesis processing and the division processing according to another embodiment of the invention.

DETAILED DESCRIPTION

With reference to the drawings, the following describes exemplary embodiments of the present invention.

Configuration of X-Ray Inspection Apparatus

Figure 1:
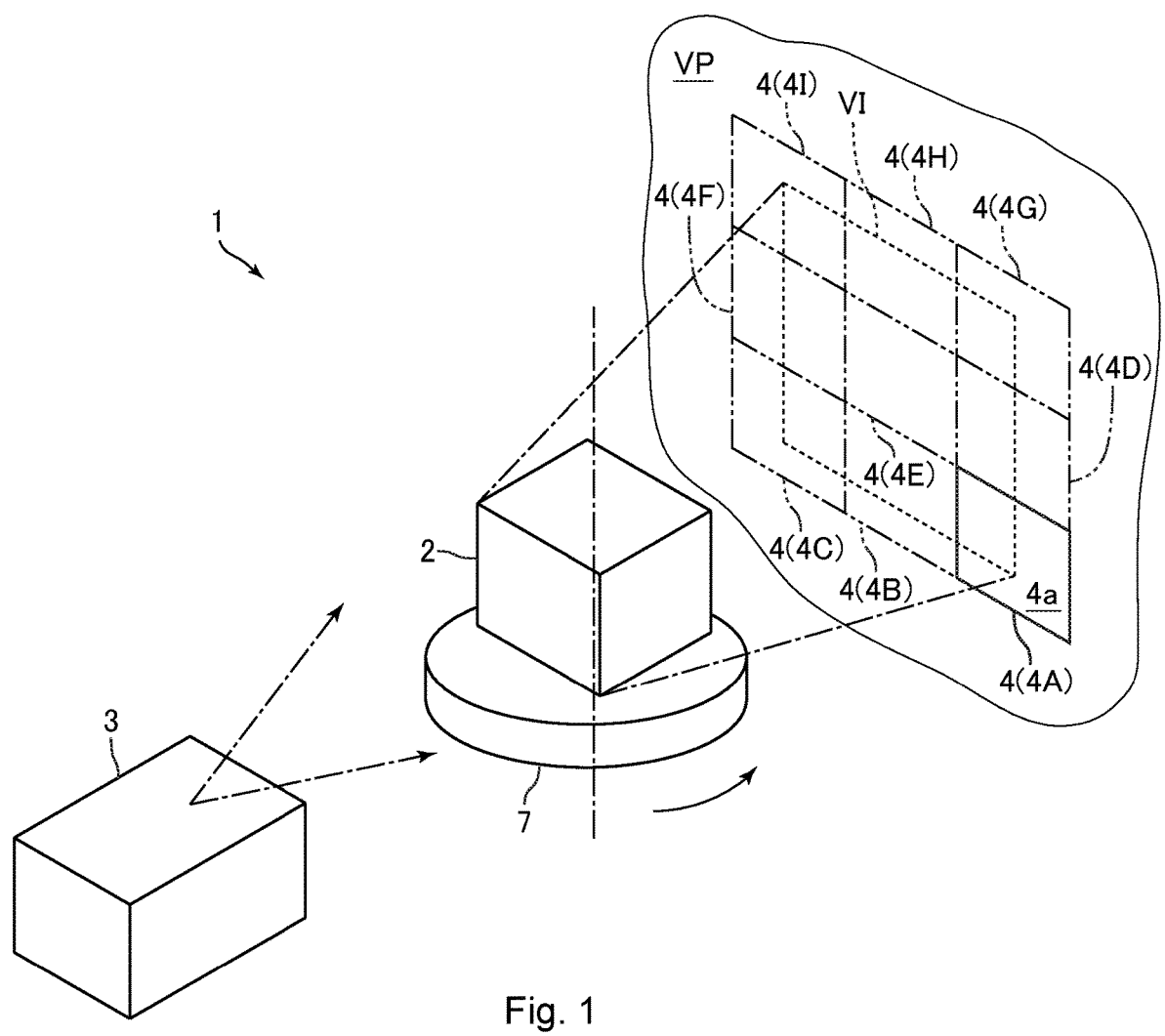
FIG. 1 is a schematic diagram of a mechanical configuration of an X-ray inspection apparatus according to an embodiment of the invention.
Figure 2:
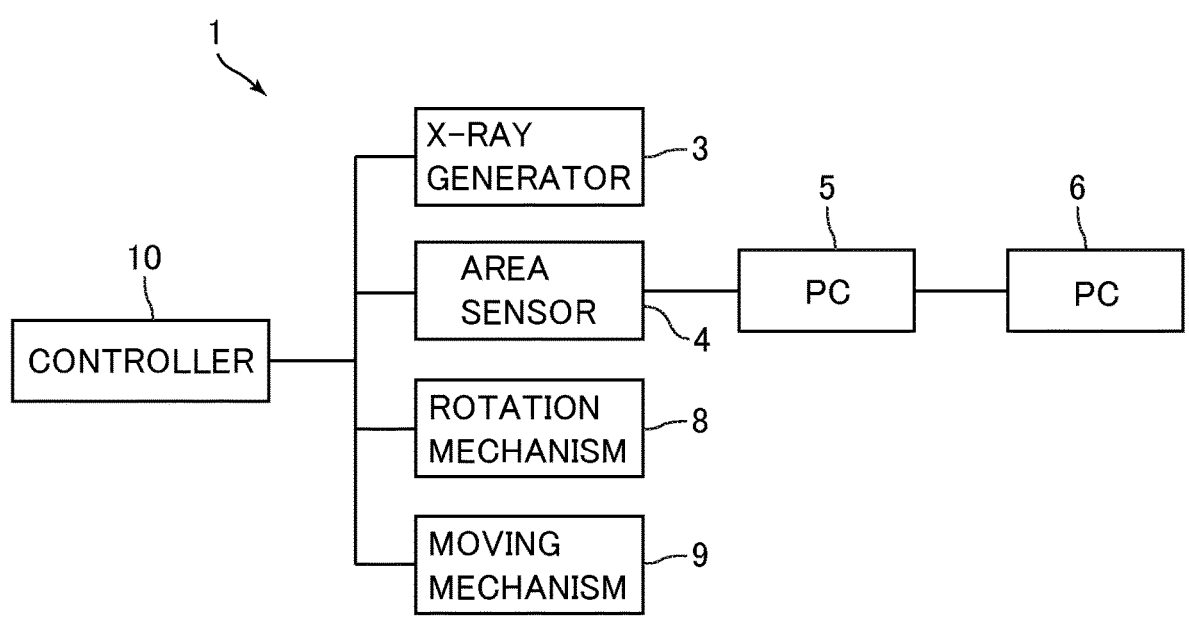
FIG. 2 is a block diagram for explaining a schematic configuration of the X-ray inspection apparatus illustrated in FIG. 1.

FIG. 1 is a schematic diagram of a mechanical configuration of an X-ray inspection apparatus 1 according to an embodiment of the present invention. FIG. 2 is a block diagram for explaining a schematic configuration of the X-ray inspection apparatus 1 illustrated in FIG. 1.

The X-ray inspection apparatus 1 of the present embodiment is an apparatus for nondestructively inspecting the inside of an inspection object 2 such as an industrial product. Specifically, the X-ray inspection apparatus 1 is an apparatus for inspecting a relatively large inspection object 2 such as an engine block. This X-ray inspection apparatus 1 includes an X-ray generator 3 that irradiates the inspection object 2 with X-rays, and a two-dimensional X-ray detector 4 (hereinafter referred to as "area sensor 4") that is arranged so as to sandwich the inspection object 2 between the X-ray generator 3 and the two-dimensional X-ray detector 4.

The X-ray inspection apparatus 1 further includes processing units 5 and 6 that take in and process X-ray images acquired by the area sensor 4, a table 7 on which the inspection object 2 is placed, a rotation mechanism 8 that rotates the table 7, and a moving mechanism 9 that translates the area sensor 4. The X-ray inspection apparatus 1 of the present embodiment includes the two processing units 5 and 6, the processing unit 5 serving as a first processing unit and the processing unit 6 serving as a second processing unit. The X-ray generator 3, the area sensor 4, the rotation mechanism 8, and the moving mechanism 9 are connected to a controller 10.

The processing units 5 and 6 include a computation unit such as a CPU, and a storage unit such as a semiconductor memory. The processing units 5 and 6 of the present embodiment are personal computers (PCs). Thus, in the following description, the processing unit 5 is referred to as "PC 5" and the processing unit 6 is referred to as "PC 6". The PC 5 is connected to the area sensor 4 and takes in the X-ray images acquired by the area sensor 4. The PC 6 is connected to the PC 5.

The X-ray generator 3 emits conical X-rays (cone beam) toward the inspection object 2, for example. The optical axis of the X-ray generator 3 is parallel to the horizontal direction. The area sensor 4 is a two-dimensional camera. A detection surface 4a of the area sensor 4 is formed in a rectangular shape. Specifically, the detection surface 4a is formed in a square shape. The length of one side of the detection surface 4a is 200 mm, for example. Assuming that a direction that is parallel to the optical axis of the X-ray generator 3 is a front-rear direction, the detection surface 4a is disposed so as to be orthogonal to the front-rear direction. Further assuming that a direction that is orthogonal to the vertical direction and the front-rear direction is a horizontal direction, the area sensor 4 is arranged such that, out of the four sides of the detection surface 4a formed in a square shape, the two sides are parallel to the vertical direction and the remaining two sides are parallel to the horizontal direction. The horizontal direction of the present embodiment is a first direction that is a predetermined direction parallel to the detection surface 4a, and the vertical direction is a second direction that is a direction parallel to the detection surface 4a and is a direction orthogonal to the first direction.

The table 7 is arranged between the X-ray generator 3 and the area sensor 4 in the front-rear direction so that the inspection object 2 is placed between the X-ray generator 3 and the area sensor 4. The rotation mechanism 8 rotates the table 7 with the vertical direction as the axial direction of rotation. That is, the rotation mechanism 8 rotates the inspection object 2 that is placed on the table 7 so that the X-ray generator 3 and the area sensor 4 relatively rotate with respect to the inspection object 2 on the outer circumferential side of the inspection object 2. The moving mechanism 9 translates the area sensor 4 in the horizontal direction and the vertical direction. That is, the moving mechanism 9 translates the area sensor 4 so that the area sensor 4 relatively moves in the horizontal direction and the vertical direction with respect to the inspection object 2. In the following description, the direction of relative rotation of the X-ray generator 3 and the area sensor 4 with respect to the inspection object 2 may be described as "relative rotation direction".

Assuming that a plane including the detection surface 4a of the area sensor 4 is a virtual projection plane VP, and a projection image of the entire inspection object 2 that is projected on the virtual projection plane VP by the X-rays emitted by the X-ray generator 3 is a virtual projection image VI, the detection surface 4a is smaller than the virtual projection image VI in the vertical direction and the horizontal direction. In the present embodiment, when the area sensor 4 is moved to nine places, it is possible to acquire X-ray images of the entire inspection object 2 by the area sensor 4.

Specifically, when the area sensor 4 is moved to nine places, which are a first arrangement position 4A on which the right end side of a lower end side portion of the inspection object 2 is projected, a second arrangement position 4B on which the middle portion in the horizontal direction of the lower end side portion of the inspection object 2 is projected, a third arrangement position 4C on which the left end side of the lower end side portion of the inspection object 2 is projected, a fourth arrangement position 4D on which the right end side of the central portion in the vertical direction of the inspection object 2 is projected, a fifth arrangement position 4E on which the central portion of the inspection object 2 is projected, a sixth arrangement position 4F on which the left end side of the central portion in the vertical direction of the inspection object 2 is projected, a seventh arrangement position 4G on which the right end side of an upper end side portion of the inspection object 2 is projected, an eighth arrangement position 4H on which the middle portion in the horizontal direction of the upper end side portion of the inspection object 2 is projected, and a ninth arrangement position 4I on which the left end side of the upper end side portion of the inspection object 2 is projected, it is possible to acquire the X-ray images of the entire inspection object 2 by the area sensor 4.

When the area sensor 4 that is placed at the first arrangement position 4A moves to the left side by the length of one side of the detection surface 4a, the area sensor 4 is placed at the second arrangement position 4B, and when the area sensor 4 that is placed at the second arrangement position 4B moves to the left side by the length of one side of the detection surface 4a, the area sensor 4 is placed at the third arrangement position 4C. When the area sensor 4 that is placed at the third arrangement position 4C moves to the right side by twice the length of one side of the detection surface 4a and moves to the upper side by the length of one side of the detection surface 4a, the area sensor 4 is placed at the fourth arrangement position 4D.

Similarly, when the area sensor 4 that is placed at the fourth arrangement position 4D moves to the left side by the length of one side of the detection surface 4a, the area sensor 4 is placed at the fifth arrangement position 4E, and when the area sensor 4 that is placed at the fifth arrangement position 4E moves to the left side by the length of one side of the detection surface 4a, the area sensor 4 is placed at the sixth arrangement position 4F. Furthermore, when the area sensor 4 that is placed at the sixth arrangement position 4F moves to the right side by twice the length of one side of the detection surface 4a and moves to the upper side by the length of one side of the detection surface 4a, the area sensor 4 is placed at the seventh arrangement position 4G. When the area sensor 4 that is placed at the seventh arrangement position 4G moves to the left side by the length of one side of the detection surface 4a, the area sensor 4 is placed at the eighth arrangement position 4H, and when the area sensor 4 that is placed at the eighth arrangement position 4H moves to the left side by the length of one side of the detection surface 4a, the area sensor 4 is placed at the ninth arrangement position 4I.

In the present embodiment, no matter where the area sensor 4 is placed at any positions of the first arrangement position 4A to the ninth arrangement position 4I, a portion of the inspection object 2 is projected onto the detection surface 4a of the area sensor 4. However, when the area sensor 4 is placed at any positions of the first arrangement position 4A to the ninth arrangement position 4I, a portion of the inspection object 2 may be not projected on the detection surface 4a. In the present embodiment, an irradiation region of the X-ray generator 3 is set so that the virtual projection image VI is projected onto the virtual projection plane VP without having to move the X-ray generator 3.

X-Ray Image Acquisition Method

When the inspection object 2 is inspected with the X-ray inspection apparatus 1, the X-ray inspection apparatus 1 acquires the X-ray images of the inspection object 2 in the following manner. First, the controller 10 adjusts the rotation mechanism 8 so that the rotation position of the rotation mechanism 8 is at a predetermined origin position. The controller 10 further causes the moving mechanism 9 to move and stop the area sensor 4 to the first arrangement position 4A, for example. In this state, the controller 10 performs an image acquisition operation that rotates the inspection object 2 placed on the table 7 by 360° by the rotation mechanism 8 and that also causes the area sensor 4 to acquire X-ray images A1 to A1000 (see FIG. 3) for each fixed angle. In the image acquisition operation of the present embodiment, 1000 X-ray images A1 to A1000 for each 0.36° are acquired in sequence. The number of the X-ray images acquired in the image acquisition operation may be less than 1000 or may be more than 1000.

Thereafter, the controller 10 performs a moving operation that moves the area sensor 4 to the left direction by the moving mechanism 9. In this moving operation, the area sensor 4 moves from the first arrangement position 4A to the second arrangement position 4B and stops. In this state, the controller 10 performs the image acquisition operation that rotates the inspection object 2 by 360° by the rotation mechanism 8 and that also causes the area sensor 4 to sequentially acquire 1000 X-ray images B1 to B1000 (see FIG. 3) for each 0.36°. Thereafter, the controller 10 performs the moving operation that moves the area sensor 4 from the second arrangement position 4B to the third arrangement position 4C by the moving mechanism 9. Furthermore, the controller 10 performs the image acquisition operation that rotates the inspection object 2 by 360° by the rotation mechanism 8 and that also causes the area sensor 4 to sequentially acquire 1000 X-ray images C1 to C1000 (see FIG. 3) for each 0.36°.

The X-ray images A1, B1, and C1 are X-ray images acquired at the same angle in the relative rotation direction of the area sensor 4 with respect to the inspection object 2, and when the X-ray images A1, B1, and C1 are synthesized by being sequentially arranged in this order from the right side and joined together, an X-ray image of the lower end side portion of the inspection object 2 at the origin position in the relative rotation direction is obtained. That is, each of the X-ray images A1, B1, and C1 is an X-ray image of the lower end side portion of the inspection object 2 at the origin position in the relative rotation direction and is also an X-ray image of the lower end side portion of the inspection object 2 divided in the horizontal direction.

Similarly, the X-ray images A2, B2, and C2 are X-ray images acquired at the same angle in the relative rotation direction, and when the X-ray images A2, B2, and C2 are synthesized by being sequentially arranged in this order from the right side and joined together, an X-ray image of the lower end side portion of the inspection object 2 at the position shifted by 0.36° from the origin position in the relative rotation direction is obtained. That is, each of the X-ray images A2, B2, and C2 is an X-ray image of the lower end side portion of the inspection object 2 at the position shifted by 0.36° from the origin position in the relative rotation direction and is also an X-ray image of the lower end side portion of the inspection object 2 divided in the horizontal direction.

That is, assuming that "n" is an integer from 1 to 1000, the X-ray images An, Bn, and Cn are X-ray images acquired at the same angle in the relative rotation direction, and when the X-ray images An, Bn, and Cn are synthesized by being sequentially arranged in this order from the right side and joined together, an X-ray image of the lower end side portion of the inspection object 2 at the position shifted by $(0.36 \times (n-1))°$ from the origin position in the relative rotation direction is obtained. In addition, each of the X-ray images An, Bn, and Cn is an X-ray image of the lower end side portion of the inspection object 2 at the position shifted by $(0.36 \times (n-1))°$ from the origin position in the relative rotation direction and is also an X-ray image of the lower end side portion of the inspection object 2 divided in the horizontal direction.

As just described, when the image acquisition operation and the moving operation are alternately performed, an X-ray image of the lower end side portion of the inspection object 2 divided in the horizontal direction for each 0.36° in the relative rotation direction is acquired extending over 360°. That is, the controller 10 causes the area sensor 4 to acquire the X-ray images of the lower end side portion of the inspection object 2 divided in the horizontal direction for each fixed angle in the relative rotation direction extending over 360°, by alternately performing the image acquisition operation that causes the X-ray generator 3 and the area sensor 4 to relatively rotate by 360° with respect to the inspection object 2 by the rotation mechanism 8 in a state in which the area sensor 4 is stopped and causes the area sensor 4 to acquire an X-ray image for each fixed angle and performing the moving operation that relatively moves the area sensor 4 to the left direction with respect to the inspection object 2 by the moving mechanism 9.

The controller 10 may acquire the X-ray images C1 to C1000 after having acquired the X-ray images A1 to A1000, and may acquire the X-ray images B1 to B1000 thereafter. Furthermore, the controller 10 may acquire the X-ray images A1 to A1000 after having acquired the X-ray images B1 to B1000, and may acquire the X-ray images C1 to C1000 thereafter, or may acquire the X-ray images C1 to C1000 after having acquired the X-ray images B1 to B1000, and may acquire the X-ray images A1 to A1000 thereafter. Moreover, the controller 10 may acquire the X-ray images B1 to B1000 after having acquired the X-ray images C1 to C1000, and may acquire the X-ray images A1 to A1000 thereafter, or may acquire the X-ray images A1 to A1000 after having acquired the X-ray images C1 to C1000, and may acquire the X-ray images B1 to B1000 thereafter.

Assuming that a plurality of X-ray images of the lower end side portion of the inspection object 2 divided in the horizontal direction and acquired for each fixed angle in the relative rotation direction extending over 360° are one-row X-ray images P1, the controller 10, when the one-row X-ray images P1 are acquired by the area sensor 4, moves the area sensor 4 from the third arrangement position 4C to the fourth arrangement position 4D by the moving mechanism 9. That is, the controller 10 moves the area sensor 4 in the right direction and the upper direction by the moving mechanism 9.

Subsequently, the controller 10 performs the same image acquisition operation as the above-described image acquisition operation and causes the area sensor 4 that is placed at the fourth arrangement position 4D to acquire the X-ray images D1 to D1000, and thereafter performs the same moving operation as the above-described moving operation and moves the area sensor 4 from the fourth arrangement position 4D to the fifth arrangement position 4E. Similarly, the controller 10 performs the image acquisition operation and causes the area sensor 4 placed at the fifth arrangement position 4E to acquire X-ray images E1 to E1000, then performs the moving operation and moves the area sensor 4 from the fifth arrangement position 4E to the sixth arrangement position 4F, and thereafter performs the image acquisition operation and causes the area sensor 4 placed at the sixth arrangement position 4F to acquire X-ray images F1 to F1000.

As just described, when the one-row X-ray images P1 are acquired by the area sensor 4, the controller 10 moves the area sensor 4 in the right direction and the upper direction by the moving mechanism 9, then alternately performs the image acquisition operation and the moving operation, and causes the area sensor 4 to acquire the X-ray images of the central portion in the vertical direction of the inspection object 2 divided in the horizontal direction for each 0.36° in the relative rotation direction extending over 360°. That is, assuming that a plurality of X-ray images of the central portion in the vertical direction of the inspection object 2 divided in the horizontal direction and acquired for each fixed angle in the relative rotation direction extending over 360° are one-row X-ray images P2, the controller 10, when the one-row X-ray images P1 are acquired by the area sensor 4, moves the area sensor 4 in the right direction and the upper direction by the moving mechanism 9, then alternately performs the image acquisition operation and the moving operation, and causes the area sensor 4 to acquire the one-row X-ray images P2 next in the vertical direction.

Furthermore, when the one-row X-ray images P2 are acquired by the area sensor 4, the controller 10 moves the area sensor 4 from the sixth arrangement position 4F to the seventh arrangement position 4G by the moving mechanism 9. Thereafter, the controller 10 similarly performs the image acquisition operation and causes the area sensor 4 placed at the seventh arrangement position 4G to acquire X-ray images G1 to G1000, and then performs the moving operation and moves the area sensor 4 from the seventh arrangement position 4G to the eighth arrangement position 4H. Similarly, the controller 10 performs the image acquisition operation and causes the area sensor 4 placed at the eighth arrangement position 4H to acquire X-ray images H1 to H1000, then performs the moving operation and moves the area sensor 4 from the eighth arrangement position 4H to the ninth arrangement position 4I, and thereafter performs the image acquisition operation and causes the area sensor 4 placed at the ninth arrangement position 4I to acquire X-ray images I1 to I1000. When the X-ray images I1 to I1000 are acquired, the acquisition of the X-ray images of the inspection object 2 by the area sensor 4 is ended.

As just described, when the one-row X-ray images P2 are acquired by the area sensor 4, the controller 10 moves the area sensor 4 in the right direction and the upper direction by the moving mechanism 9, then alternately performs the image acquisition operation and the moving operation, and causes the area sensor 4 to acquire the X-ray images of the upper end side portion of the inspection object 2 divided in the horizontal direction for each 0.36° in the relative rotation direction extending over 360°. That is, assuming that a plurality of X-ray images of the upper end side portion of the inspection object 2 divided in the horizontal direction and acquired for each fixed angle in the relative rotation direction extending over 360° are one-row X-ray images P3, the controller 10, when the one-row X-ray images P2 are acquired by the area sensor 4, moves the area sensor 4 in the right direction and the upper direction by the moving mechanism 9, then alternately performs the image acquisition operation and the moving operation, and causes the area sensor 4 to acquire the one-row X-ray images P3 next in the vertical direction.

X-Ray Image Processing Method

Figure 3A:
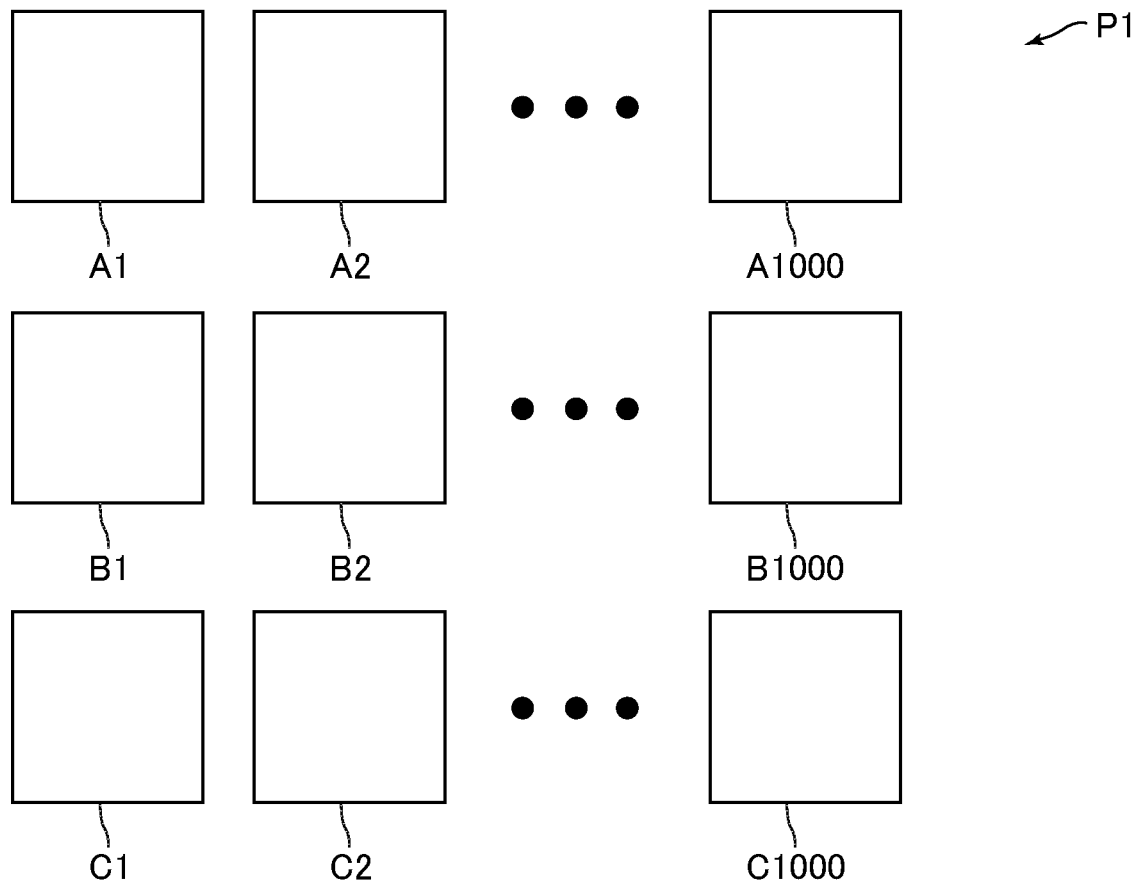
FIGS. 3A and 3B are diagrams explaining synthesis processing and division processing performed in a second processing unit illustrated in FIG. 2.

FIG. 3 is a diagram for explaining synthesis processing and division processing performed in the PC 6 illustrated in FIG. 2.

The PC 5 sequentially takes in the X-ray images acquired by the area sensor 4. Furthermore, upon taking in the one-row X-ray images P1 (that is, the X-ray images A1 to A1000, B1 to B1000, and C1 to C1000), the PC 5 transmits the taken-in one-row X-ray images P1 to the PC 6 as is. The PC 6 first executes synthesis processing for synthesizing a plurality of X-ray images acquired at the same angle in the relative rotation direction of the area sensor 4 with respect to the inspection object 2 among the one-row X-ray images P1 by joining the X-ray images together in the horizontal direction for each fixed angle in the relative rotation direction.

Figure 3B:
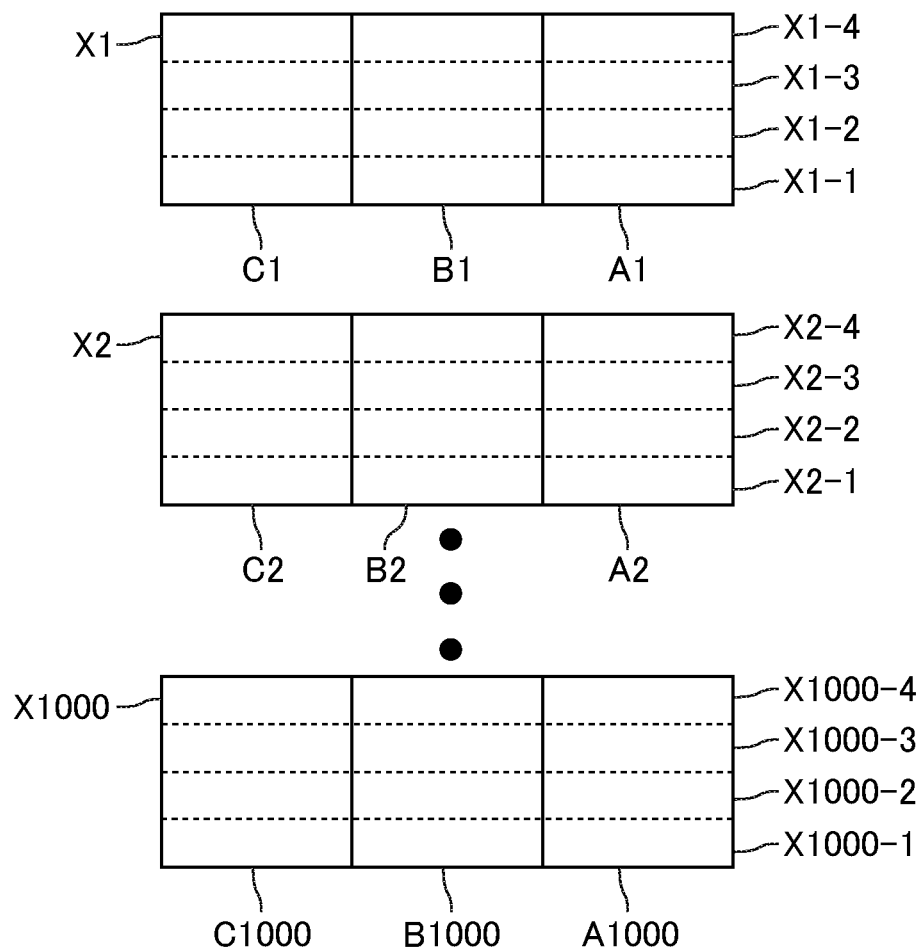

Specifically, as illustrated in FIG. 3(B), the PC 6 synthesizes the three X-ray images A1, B1, and C1 by arranging them in this order from the right side and joining them together, and generates a synthesized X-ray image X1. Similarly, the PC 6 synthesizes the three X-ray images A2, B2, and C2 by arranging them in this order from the right side and joining them together, and generates a synthesized X-ray image X2. Furthermore, the PC 6 performs the same processing until a synthesized X-ray image X1000 for which the three X-ray images A1000, B1000, and C1000 are joined together is generated. That is, the PC 6 synthesizes the three X-ray images An, Bn, and Cn by arranging them in this order from the right side and joining them together, and generates 1000 synthesized X-ray images Xn.

After the synthesis processing, the PC 6 executes division processing for dividing the synthesized X-ray image X1 (X-ray image that has been synthesized) in the vertical direction into X-ray images X1-1 to X1-4 that are a plurality of strip X-ray images. In the present embodiment, the PC 6 divides the synthesized X-ray image X1 into four strip X-ray images X1-1 to X1-4. The PC 6 equally divides the synthesized X-ray image X1 into the four strip X-ray images X1-1 to X1-4. Similarly, the PC 6 executes the division processing for dividing the synthesized X-ray image X2 in the vertical direction into X-ray images X2-1 to X2-4 that are four strip X-ray images. Furthermore, the PC 6 performs the same division processing until the synthesized X-ray image X1000 is divided into strip X-ray images X1000-1 to X1000-4. That is, the PC 6 executes the division processing for dividing the synthesized X-ray image Xn in the vertical direction into four strip X-ray images Xn-1 to Xn-4. The strip X-ray images Xn-1 to Xn-4 are arranged in this order from the lower side.

The PC 6 may divide 1000 synthesized X-ray images Xn in sequence after having generated the 1000 synthesized X-ray images Xn, or may divide the generated synthesized X-ray image Xn each time one synthesized X-ray image Xn is generated.

After the division processing, the PC 6 executes CT image generation processing for generating a CT image by performing a predetermined computation based on strip X-ray images for 360° that are at the same position in the vertical direction. That is, the PC 6 generates a CT image of the bottom layer of the inspection object 2 by performing the computation based on the 1000 strip X-ray image X1-1, the strip X-ray image X2-1, . . . , and the strip X-ray image X1000-1. Furthermore, the PC 6 generates a CT image of the second layer from the bottom of the inspection object 2 by performing the computation based on the 1000 strip X-ray image X1-2, the strip X-ray image X2-2, . . . , and the strip X-ray image X1000-2, generates a CT image of the third layer from the bottom of the inspection object 2 by performing the computation based on the 1000 strip X-ray image X1-3, the strip X-ray image X2-3, . . . , and the strip X-ray image X1000-3, and generates a CT image of the fourth layer from the bottom of the inspection object 2 by performing the computation based on the 1000 strip X-ray image X1-4, the strip X-ray image X2-4, . . . , and the strip X-ray image X1000-4.

Note that the number of divisions of the synthesized X-ray image Xn in the division processing may be two or three, or may be five or more. The number of divisions of the synthesized X-ray image Xn in the division processing is set according to the processing power of the PC 6. Specifically, when the processing power of the PC 6 is increased, the number of divisions of the synthesized X-ray image Xn in the division processing is decreased. On the other hand, when the processing power of the PC 6 is decreased, the number of divisions of the synthesized X-ray image Xn in the division processing is increased.

Furthermore, in parallel to the synthesis processing, the division processing, and the CT image generation processing for the one-row X-ray images P1 performed by the PC 6, the PC 5 sequentially takes in the respective X-ray images constituting the one-row X-ray images P2. When completing the taking-in of the one-row X-ray images P2, the PC 5 transmits the taken-in one-row X-ray images P2 to the PC 6 as is. When completing the synthesis processing, the division processing, and the CT image generation processing for the one-row X-ray images P1, the PC 6 executes, in the same procedure as the above-described procedure, the synthesis processing, the division processing, and the CT image generation processing for the one-row X-ray images P2, and generates a CT image of the fifth layer from the bottom of the inspection object 2, a CT image of the sixth layer from the bottom of the inspection object 2, a CT image of the seventh layer from the bottom of the inspection object 2, and a CT image of the eighth layer from the bottom of the inspection object 2.

Note that the PC 5 may transmit the taken-in one-row X-ray images P2 to the PC 6 before completing the synthesis processing, the division processing, and the CT image generation processing for the one-row X-ray images P1 in the PC 6, or may transmit the taken-in one-row X-ray images P2 to the PC 6 after completing the synthesis processing, the division processing, and the CT image generation processing for the one-row X-ray images P1 in the PC 6.

Furthermore, in parallel to the synthesis processing, the division processing, and the CT image generation processing for the one-row X-ray images P2 performed in the PC 6, the PC 5 sequentially takes in the respective X-ray images constituting the one-row X-ray images P3. When completing the taking-in of the one-row X-ray images P3, the PC 5 transmits the taken-in one-row X-ray images P3 to the PC 6 as is. The PC 6 executes, in the same procedure as the above-described procedure, the synthesis processing, the division processing, and the CT image generation processing for the one-row X-ray images P3, and generates a CT image of the ninth layer from the bottom of the inspection object 2, a CT image of the tenth layer from the bottom of the inspection object 2, a CT image of the eleventh layer from the bottom of the inspection object 2, and a CT image of the top layer of the inspection object 2.

Main Effects of Present Embodiment

As in the foregoing, in the present embodiment, by alternately performing the image acquisition operation that rotates the inspection object 2 by 360° by the rotation mechanism 8 and that also causes the area sensor 4 to acquire an X-ray image for each fixed angle and performing the moving operation that moves the area sensor 4 to the left direction by the moving mechanism 9, the X-ray images of the lower end side portion of the inspection object 2 divided in the horizontal direction, the X-ray images of the central portion in the vertical direction of the inspection object 2 divided in the horizontal direction, and the X-ray images of the upper end side portion of the inspection object 2 divided in the horizontal direction are acquired, for each fixed angle in the rotation direction of the inspection object 2 extending over 360°. Thus, in the present embodiment, even when the inspection object 2 is large, in acquiring the X-ray images necessary for generating the CT images of the entire inspection object 2, it is possible to reduce the number of times of rotating the inspection object 2. Accordingly, in the present embodiment, even when the inspection object 2 is large, it is possible to shorten the acquisition time for the X-ray images necessary for generating the CT images of the entire inspection object 2.

In the present embodiment, the PC 6 executes the synthesis processing for synthesizing three X-ray images acquired at the same angle in the rotation direction of the inspection object 2 among the one-row X-ray images P1 by joining the X-ray images together in the horizontal direction for each fixed angle of the relative rotation direction, and after the synthesis processing, executes the division processing for dividing the synthesized X-ray image in the vertical direction into four strip X-ray images that are the X-ray images in a band-shape, and after the division processing, executes the CT image generation processing for generating a CT image by performing the predetermined computation based on the strip X-ray images for 360° that are at the same position in the vertical direction. Furthermore, for the one-row X-ray images P2 and P3 also, the PC 6 similarly executes the synthesis processing, the division processing, and the CT image generation processing. In the present embodiment, the number of divisions of the synthesized X-ray image in the division processing is set according to the processing power of the PC 6. Thus, in the present embodiment, it is possible to shorten the time for the CT image generation processing for generating a CT image by performing a predetermined computation based on the strip X-ray images.

As in the foregoing, in the present embodiment, even when the inspection object 2 is large, it is possible to shorten the acquisition time for the X-ray images necessary for generating the CT images of the entire inspection object 2, and it is also possible to shorten the time for the CT image generation processing for generating the CT images based on the acquired X-ray images. Accordingly, in the present embodiment, even when the inspection object 2 is large, it is possible to shorten the inspection time for the inspection object 2.

Furthermore, in the present embodiment, because the PC 6 executes the CT image generation processing of a high processing load in parallel while the PC 5 executes the processing for taking in the X-ray images of a high processing load, as compared with the case in which the processing for taking in the X-ray images and the CT image generation processing are executed by a single PC having the processing power of the same extent as the processing power of the PC 5 and the PC 6, it is possible to further shorten the generation processing time for the CT images and, as a result, it is possible to further shorten the inspection time for the inspection object 2.

First Modification of X-Ray Image Processing Method

FIG. 4 is a diagram for explaining the synthesis processing and the division processing according to another embodiment of the invention.

In the above-described embodiment, the PC 6 may execute the division processing for dividing the one-row X-ray images taken in from the area sensor 4 into a plurality of X-ray images in the vertical direction (specifically, dividing each of a plurality of X-ray images in the vertical direction), and after the division processing, execute the synthesis processing for synthesizing the strip X-ray images for each fixed angle in the rotation direction of the inspection object 2 by joining a plurality of X-ray images obtained after the division that are at the same position in the vertical direction and are acquired at the same angle in the rotation direction of the inspection object 2 together in the horizontal direction, and after the synthesis processing, execute the CT image generation processing for generating a CT image by performing the predetermined computation based on the strip X-ray images for 360° that are at the same position in the vertical direction.

Figure 4A:
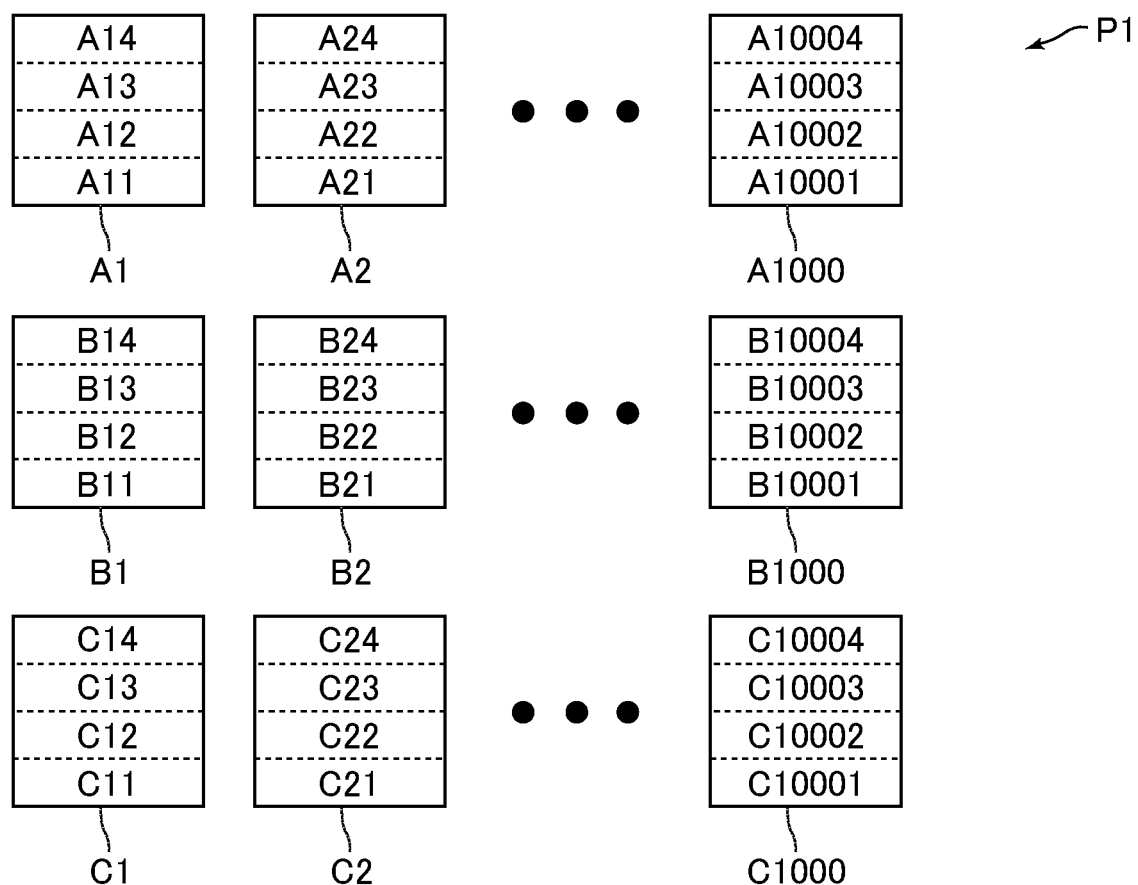

That is, as illustrated in FIG. 4(A), the PC 6 first executes the division processing and divides the X-ray images acquired by the area sensor 4 placed at the first arrangement position 4A, like the X-ray image A1 is divided by four in the vertical direction into divided X-ray images A11 to A14 or the X-ray image A2 is divided by four in the vertical direction into divided X-ray images A21 to A24, until the X-ray image A1000 is divided by four into divided X-ray images A10001 to A10004, for example.

Similarly, the PC 6 divides the X-ray images acquired by the area sensor 4 placed at the second arrangement position 4B, like the X-ray image B1 is divided by four in the vertical direction into divided X-ray images B11 to B14 or the X-ray image B2 is divided by four in the vertical direction into divided X-ray images B21 to B24, until the X-ray image B1000 is divided by four into divided X-ray images B10001 to B10004. Furthermore, the PC 6 divides the X-ray images acquired by the area sensor 4 placed at the third arrangement position 4C, like the X-ray image C1 is divided by four in the vertical direction into divided X-ray images C11 to C14 or the X-ray image C2 is divided by four in the vertical direction into divided X-ray images C21 to C24, until the X-ray image C1000 is divided by four into divided X-ray images C10001 to C10004.

The PC 6 performs the synthesis processing after the division processing and, as illustrated in FIG. 4(B), synthesizes a strip X-ray image X1-1 by arranging the three divided X-ray images A11 to C11 that are at the same position in the vertical direction and acquired at the same angle in the rotation direction of the inspection object 2 in sequence from the right side, and joining them together in the horizontal direction. Similarly, by performing the synthesis processing, the PC 6 synthesizes a strip X-ray image X1-2 by joining the divided X-ray images A12 to C12 together, synthesizes a strip X-ray image X1-3 by joining the divided X-ray images A13 to C13 together, and synthesizes a strip X-ray image X1-4 by joining the divided X-ray images A14 to C14 together. Furthermore, the PC 6 performs the same synthesis processing until the strip X-ray images X1000-1 to X1000-4 are synthesized.

After the synthesis processing, as with the above-described embodiment, the PC 6 further executes the CT image generation processing for generating a CT image by performing a predetermined computation based on the strip X-ray images for 360° that are at the same position in the vertical direction. Even in this case, by setting the number of divisions of the X-ray images in the division processing according to the processing power of the PC 6, as with the above-described embodiment, it is possible to shorten the time for the CT image generation processing.

Second Modification of X-Ray Image Processing Method

In the above-described embodiment, when the processing power of the PC 6 is relatively high, the PC 6 may execute the synthesis processing and the CT image generation processing, without executing the division processing to the one-row X-ray images P1 to P3. That is, the PC 6 may, after the synthesis processing for generating the synthesized X-ray images X1 to X1000, execute the CT image generation processing for generating a CT image by performing a predetermined computation based on the synthesized X-ray images X1 to X1000 (synthesized X-ray images) for 360°, for example.

In this case, a CT image is generated based on the one-row X-ray images P1 that are the X-ray images of the lower end side portion of the inspection object 2, a CT image is generated based on the one-row X-ray images P2 that are the X-ray images of the central portion in the vertical direction of the inspection object 2, and a CT image is generated based on the one-row X-ray images P3 that are the X-ray images of the upper end side portion of the inspection object 2. That is, the CT image is generated for each of the one-row X-ray images P1 to P3. Thus, even when the inspection object 2 is large in both directions of the horizontal direction and the vertical direction, as compared with the case in which an X-ray image of the entire inspection object 2 is acquired by a large area sensor for each fixed angle in the relative rotation direction extending over 360° and a CT image of the entire inspection object 2 is generated at one time by performing a predetermined computation based on the acquired X-ray images, it is possible to shorten the time for the CT image generation processing.

Accordingly, even in this case, it is possible to shorten the acquisition time for the X-ray images necessary for generating the CT images of the entire inspection object 2 and it is also possible to shorten the time for the CT image generation processing for generating the CT images based on the acquired X-ray images even when the inspection object 2 is large. As a result, even when the inspection object 2 is large, it is possible to shorten the inspection time for the inspection object 2.

Other Embodiments

In the above-described embodiment, although the PC 6 executes the synthesis processing and the division processing, the PC 5 may execute the synthesis processing and the division processing. Furthermore, in the above-described embodiment, although the X-ray inspection apparatus 1 includes the two PCs 5 and 6, the X-ray inspection apparatus 1 may include no PC 6 if the processing power of the PC 5 is high. In this case, the PC 5 executes the processing for taking in the X-ray images, the synthesis processing, the division processing, and the CT image generation processing. In the above-described second modification of the X-ray image processing method, the PC 5 may execute the synthesis processing and the PC 6 may execute the CT image generation processing. In the above-described second modification of the X-ray image processing method, in the case where the X-ray inspection apparatus 1 include no PC 6, the PC 5 executes the processing for taking in the X-ray images, the synthesis processing, and the CT image generation processing.

In the above-described embodiment, although the rotation mechanism 8 rotates the inspection object 2 placed on the table 7, the rotation mechanism 8 may rotate the X-ray generator 3 and the area sensor 4. In the above-described embodiment, although the moving mechanism 9 moves the area sensor 4 in the vertical direction and the horizontal direction, the moving mechanism 9 may move the inspection object 2 in the vertical direction and the horizontal direction. Furthermore, the moving mechanism 9 may translate the area sensor 4 in the horizontal direction. In this case, the X-ray inspection apparatus 1 includes a moving mechanism that translates the inspection object 2 in the vertical direction. Furthermore, the moving mechanism 9 may translate the inspection object 2 in the horizontal direction. In this case, the X-ray inspection apparatus 1 includes a moving mechanism that translates the area sensor 4 in the vertical direction. In the above-described embodiment, the moving mechanism 9 may translate the X-ray generator 3 in the vertical direction and the horizontal direction together with the area sensor 4. In this case, the irradiation region of the X-ray generator 3 is set so that the virtual projection image VI (projection image of the entire inspection object 2) cannot be projected onto the virtual projection plane VP unless the X-ray generator 3 is moved, for example.

In the above-described embodiment, it is made possible to acquire the X-ray images of the entire inspection object 2 by the area sensor 4 when the area sensor 4 is moved to nine places from the first arrangement position 4A to the ninth arrangement position 4I. However, for example, the X-ray images of the entire inspection object 2 may be acquired by the area sensor 4 when the area sensor 4 is moved to six places from the first arrangement position 4A to the sixth arrangement position 4F, or the X-ray images of the entire inspection object 2 may be acquired by the area sensor 4 when the area sensor 4 is moved to four places of the first arrangement position 4A, the second arrangement position 4B, the fourth arrangement position 4D, and the fifth arrangement position 4E. Furthermore, the X-ray images of the entire inspection object 2 may be acquired by the area sensor 4 when the area sensor 4 is moved to three places from the first arrangement position 4A to the third arrangement position 4C. In this case, the detection surface 4a is larger in the vertical direction than the virtual projection image VI.

In the above-described embodiment, the number of times of moving the area sensor 4 from the first arrangement position 4A to the third arrangement position 4C at the same height (hereinafter referred to as "the number of moving on the first stage"), the number of times of moving the area sensor 4 from the fourth arrangement position 4D to the sixth arrangement position 4F at the same height (hereinafter referred to as "the number of moving on the second stage"), and the number of times of moving the area sensor 4 from the seventh arrangement position 4G to the ninth arrangement position 4I at the same height (hereinafter referred to as "the number of moving on the third stage") are equal. However, depending on the shape of the inspection object 2, the number of moving on the first stage, the number of moving on the second stage, and the number of moving on the third stage may be different.

In the above-described embodiment, the area sensor 4 may be moved from the third arrangement position 4C to the sixth arrangement position 4F when acquiring the X-ray images of the inspection object 2. In this case, the area sensor 4 is subsequently moved to the fifth arrangement position 4E, the fourth arrangement position 4D, the seventh arrangement position 4G, the eighth arrangement position 4H, and the ninth arrangement position 4I, for example. In the above-described embodiment, although the optical axis of the X-ray generator 3 is parallel to the horizontal direction, the optical axis of the X-ray generator 3 may be inclined with respect to the horizontal direction.

The invention claimed is:

1. An X-ray inspection apparatus comprising:
an X-ray generator;
a two-dimensional X-ray detector arranged so as to sandwich an inspection object between the X-ray generator and the two-dimensional X-ray detector;
a rotation mechanism configured to rotate the X-ray generator and the two-dimensional X-ray detector or rotate the inspection object so that the X-ray generator and the two-dimensional X-ray detector relatively rotate with respect to the inspection object on an outer circumferential side of the inspection object; and
a processing unit configured to take in and process X-ray images acquired by the two-dimensional X-ray detector;
the X-ray inspection apparatus further comprising:
assuming that a predetermined direction parallel to a detection surface of the two-dimensional X-ray detector is a first direction, a direction parallel to the detection surface and orthogonal to the first direction is a second direction, and a direction of relative rotation of the X-ray generator and the two-dimensional X-ray detector with respect to the inspection object is a relative rotation direction,
a moving mechanism configured to translate the two-dimensional X-ray detector or translate the inspection object so that the two-dimensional X-ray detector relatively moves in at least the first direction with respect to the inspection object; and
a controller connected to the X-ray generator, the two-dimensional X-ray detector, the rotation mechanism, and the moving mechanism, wherein
assuming that a plane including the detection surface is a virtual projection plane, and a projection image of the entire inspection object projected on the virtual projection plane by X-rays emitted by the X-ray generator is a virtual projection image,
the detection surface is smaller than the virtual projection image in at least the first direction,
the controller causes the two-dimensional X-ray detector to acquire X-ray images of the inspection object divided in the first direction at a predetermined position in the second direction for each fixed angle in the relative rotation direction extending over 360°, by alternately performing an image acquisition operation that causes the X-ray generator and the two-dimensional X-ray detector to relatively rotate by 360° with respect to the inspection object by the rotation mechanism and causes the two-dimensional X-ray detector to acquire an X-ray image for each fixed angle and performing a moving operation that relatively moves the two-dimensional X-ray detector to one side of the first direction with respect to the inspection object by the moving mechanism, and
assuming that X-ray images of the inspection object acquired for each fixed angle in the relative rotation direction extending over 360° and divided in the first direction at a predetermined position in the second direction are one-row X-ray images,
the processing unit executes synthesis processing for synthesizing a plurality of X-ray images acquired at a same angle in the relative rotation direction among the one-row X-ray images taken in from the two-dimensional X-ray detector by joining the X-ray images together in the first direction for each fixed angle of the relative rotation direction, and after the synthesis processing, executes division processing for dividing the synthesized X-ray image in the second direction into a plurality of strip X-ray images, and after the division processing, executes CT image generation processing for generating a CT image by performing a predetermined computation based on strip X-ray images for 360° that are at the same position in the second direction, or the processing unit executes division processing for dividing the one-row X-ray images taken in from the two-dimensional X-ray detector into a plurality of pieces in the second direction, and after the division processing, executes synthesis processing for synthesizing, for each fixed angle in the relative rotation direction, a strip X-ray image by joining together in the first direction a plurality of X-ray images obtained after division that are at a same position in the second direction and acquired at a same angle in the relative rotation direction, and after the synthesis processing, executes CT image generation processing for generating a CT image by performing a predetermined computation based on strip X-ray images for 360° that are at the same position in the second direction.

2. The X-ray inspection apparatus according to claim 1, wherein
the detection surface is smaller than the virtual projection image in the first direction and the second direction, and
the controller, when the one-row X-ray images are acquired by the two-dimensional X-ray detector, relatively moves the two-dimensional X-ray detector in at least the second direction with respect to the inspection object by the moving mechanism, and thereafter, by alternately performing the image acquisition operation and the moving operation, causes the two-dimensional X-ray detector to acquire the one-row X-ray images, that come next in the second direction, of the inspection object.

3. The X-ray inspection apparatus according to claim 2, wherein
the processing unit includes a first processing unit connected to the two-dimensional X-ray detector and configured to take in X-ray images acquired by the two-dimensional X-ray detector and a second processing unit connected to the first processing unit,
the first processing unit transmits the taken-in one-row X-ray images to the second processing unit as is when taking in the one-row X-ray images, and
the second processing unit executes the synthesis processing, the division processing, and the CT image generation processing.

4. The X-ray inspection apparatus according to claim 2, wherein
the processing unit includes a first processing unit connected to the two-dimensional X-ray detector and configured to take in X-ray images acquired by the two-dimensional X-ray detector and a second processing unit connected to the first processing unit,
the first processing unit executes the synthesis processing and the division processing when taking in the one-row X-ray images, and
the second processing unit executes the CT image generation processing based on strip X-ray images for 360° that are taken in from the first processing unit and are at a same position in the second direction.

5. An X-ray inspection apparatus comprising:
an X-ray generator;
a two-dimensional X-ray detector arranged so as to sandwich an inspection object between the X-ray generator and the two-dimensional X-ray detector;
a rotation mechanism configured to rotate the X-ray generator and the two-dimensional X-ray detector or rotate the inspection object so that the X-ray generator and the two-dimensional X-ray detector relatively rotate with respect to the inspection object on an outer circumferential side of the inspection object; and
a processing unit configured to take in and process X-ray images acquired by the two-dimensional X-ray detector;
the X-ray inspection apparatus further comprising:
assuming that a predetermined direction parallel to a detection surface of the two-dimensional X-ray detector is a first direction, a direction parallel to the detection surface and orthogonal to the first direction is a second direction, and a direction of relative rotation of the X-ray generator and the two-dimensional X-ray detector with respect to the inspection object is a relative rotation direction,
a moving mechanism configured to translate the two-dimensional X-ray detector or translate the inspection object so that the two-dimensional X-ray detector relatively moves in the first direction and the second direction with respect to the inspection object; and
a controller connected to the X-ray generator, the two-dimensional X-ray detector, the rotation mechanism, and the moving mechanism, wherein
assuming that a plane including the detection surface is a virtual projection plane, and a projection image of the entire inspection object projected on the virtual projection plane by X-rays emitted by the X-ray generator is a virtual projection image,
the detection surface is smaller than the virtual projection image in the first direction and the second direction,
the controller causes the two-dimensional X-ray detector to acquire X-ray images of the inspection object divided in the first direction at a predetermined position in the second direction for each fixed angle in the relative rotation direction extending over 360°, by alternately performing an image acquisition operation that causes the X-ray generator and the two-dimensional X-ray detector to relatively rotate by 360° with respect to the inspection object by the rotation mechanism and causes the two-dimensional X-ray detector to acquire an X-ray image for each fixed angle and performing a moving operation that relatively moves the two-dimensional X-ray detector to one side of the first direction with respect to the inspection object by the moving mechanism, and
assuming that X-ray images of the inspection object acquired for each fixed angle in the relative rotation direction extending over 360° and divided in the first direction at a predetermined position in the second direction are one-row X-ray images,
the controller, when the one-row X-ray images are acquired by the two-dimensional X-ray detector, relatively moves the two-dimensional X-ray detector in at least the second direction with respect to the inspection object by the moving mechanism, and thereafter, by alternately performing the image acquisition operation and the moving operation, causes the two-dimensional X-ray detector to acquire the one-row X-ray images, that come next in the second direction, of the inspection object, and
the processing unit executes synthesis processing for synthesizing a plurality of X-ray images acquired at a same angle in the relative rotation direction among the one-row X-ray images taken in from the two-dimensional X-ray detector by joining the X-ray images together in the first direction for each fixed angle of the relative rotation direction, and after the synthesis processing, executes CT image generation processing for generating a CT image by performing a predetermined computation based on synthesized X-ray images for 360°.

6. The X-ray inspection apparatus according to claim 5, wherein
the processing unit includes a first processing unit connected to the two-dimensional X-ray detector and configured to take in X-ray images acquired by the two-dimensional X-ray detector and a second processing unit connected to the first processing unit,
the first processing unit transmits the taken-in one-row X-ray images to the second processing unit as is when taking in the one-row X-ray images, and
the second processing unit executes the synthesis processing and the CT image generation processing.

7. The X-ray inspection apparatus according to claim 5, wherein
the processing unit includes a first processing unit connected to the two-dimensional X-ray detector and configured to take in X-ray images acquired by the two-dimensional X-ray detector and a second processing unit connected to the first processing unit,
the first processing unit executes the synthesis processing when taking in the one-row X-ray images, and
the second processing unit executes the CT image generation processing based on X-ray images obtained after the synthesis processing and taken in from the first processing unit.

8. A method for controlling an X-ray inspection apparatus that includes an X-ray generator; a two-dimensional X-ray detector arranged so as to sandwich an inspection object between the X-ray generator and the two-dimensional X-ray detector; and a rotation mechanism configured to rotate the X-ray generator and the two-dimensional X-ray detector or rotate the inspection object so that the X-ray generator and the two-dimensional X-ray detector relatively rotate with respect to the inspection object on an outer circumferential side of the inspection object; the X-ray inspection apparatus further including, assuming that a predetermined direction parallel to a detection surface of the two-dimensional X-ray detector is a first direction, a direction parallel to the detection surface and orthogonal to the first direction is a second direction, and a direction of relative rotation of the X-ray generator and the two-dimensional X-ray detector with respect to the inspection object is a relative rotation direction, a moving mechanism configured to translate the two-dimensional X-ray detector or translate the inspection object so that the two-dimensional X-ray detector relatively moves in at least the first direction with respect to the inspection object, in which, assuming that a plane including the detection surface is a virtual projection plane, and a projection image of the entire inspection object projected on the virtual projection plane by X-rays emitted by the X-ray generator is a virtual projection image, the detection surface is smaller than the virtual projection image in at least the first direction, the method for controlling the X-ray inspection apparatus comprising:
causing the two-dimensional X-ray detector to acquire X-ray images of the inspection object divided in the first direction at a predetermined position in the second direction for each fixed angle in the relative rotation direction extending over 360°, by alternately performing an image acquisition operation that causes the X-ray generator and the two-dimensional X-ray detector to relatively rotate by 360° with respect to the inspection object by the rotation mechanism and causes the two-dimensional X-ray detector to acquire an X-ray image for each fixed angle and performing a moving operation that relatively moves the two-dimensional X-ray detector to one side of the first direction with respect to the inspection object by the moving mechanism; and
assuming that X-ray images of the inspection object acquired for each fixed angle in the relative rotation direction extending over 360° and divided in the first direction at a predetermined position in the second direction are one-row X-ray images,
executing synthesis processing for synthesizing a plurality of X-ray images acquired at a same angle in the relative rotation direction among the one-row X-ray images taken in from the two-dimensional X-ray detector by joining the X-ray images together in the first direction for each fixed angle of the relative rotation direction, and after the synthesis processing, executing division processing for dividing the synthesized X-ray image in the second direction into a plurality of strip X-ray images, and after the division processing, executing CT image generation processing for generating a CT image by performing a predetermined computation based on strip X-ray images for 360° that are at a same position in the second direction, or executing division processing for dividing the one-row X-ray images taken in from the two-dimensional X-ray detector into a plurality of pieces in the second direction, and after the division processing, executing synthesis processing for synthesizing, for each fixed angle in the relative rotation direction, a strip X-ray image by joining together in the first direction a plurality of X-ray images obtained after division that are at a same position in the second direction and acquired at a same angle in the relative rotation direction, and after the synthesis processing, executing CT image generation processing for generating a CT image by performing a predetermined computation based on strip X-ray images for 360° that are at the same position in the second direction.

9. A method for controlling an X-ray inspection apparatus that includes an X-ray generator; a two-dimensional X-ray detector arranged so as to sandwich an inspection object between the X-ray generator and the two-dimensional X-ray detector; and a rotation mechanism configured to rotate the X-ray generator and the two-dimensional X-ray detector or rotate the inspection object so that the X-ray generator and the two-dimensional X-ray detector relatively rotate with respect to the inspection object on an outer circumferential side of the inspection object; the X-ray inspection apparatus further including, assuming that a predetermined direction parallel to a detection surface of the two-dimensional X-ray detector is a first direction, a direction parallel to the detection surface and orthogonal to the first direction is a second direction, and a direction of relative rotation of the X-ray generator and the two-dimensional X-ray detector with respect to the inspection object is a relative rotation direction, a moving mechanism configured to translate the two-dimensional X-ray detector or translate the inspection object so that the two-dimensional X-ray detector relatively moves in the first direction and the second direction with respect to the inspection object, in which, assuming that a plane including the detection surface is a virtual projection plane, and a projection image of the entire inspection object projected on the virtual projection plane by X-rays emitted by the X-ray generator is a virtual projection image, the detection surface is smaller than the virtual projection image in the first direction and the second direction, the method for controlling the X-ray inspection apparatus comprising:

causing the two-dimensional X-ray detector to acquire X-ray images of the inspection object divided in the first direction at a predetermined position in the second direction for each fixed angle in the relative rotation direction extending over 360°, by alternately performing an image acquisition operation that causes the X-ray generator and the two-dimensional X-ray detector to relatively rotate by 360° with respect to the inspection object by the rotation mechanism and causes the two-dimensional X-ray detector to acquire an X-ray image for each fixed angle and performing a moving operation that relatively moves the two-dimensional X-ray detector to one side of the first direction with respect to the inspection object by the moving mechanism;

the method further comprising:

assuming that X-ray images of the inspection object acquired for each fixed angle in the relative rotation direction extending over 360° and divided in the first direction at a predetermined position in the second direction are one-row X-ray images, causing the two-dimensional X-ray detector to acquire the one-row X-ray images, that come next in the second direction, of the inspection object when the one-row X-ray images are acquired by the two-dimensional X-ray detector, by relatively moving the two-dimensional X-ray detector in at least the second direction with respect to the inspection object by the moving mechanism, and thereafter, by alternately performing the image acquisition operation and the moving operation;

the method further comprising:

executing synthesis processing for synthesizing a plurality of X-ray images acquired at a same angle in the relative rotation direction among the one-row X-ray images taken in from the two-dimensional X-ray detector by joining the X-ray images together in the first direction for each fixed angle of the relative rotation direction, and after the synthesis processing, executing CT image generation processing for generating a CT image by performing a predetermined computation based on synthesized X-ray images for 360°.

* * * * *